United States Patent
Hartmann et al.

(10) Patent No.: US 6,302,496 B1
(45) Date of Patent: Oct. 16, 2001

(54) LOAD-DEPENDENT BRAKE-POWER REGULATOR

(75) Inventors: Willi Hartmann, Riedstadt; Johann Ludwig, Steinbach, both of (DE)

(73) Assignee: Continental Teves AG & Co., Ohg, Frankfurt (DE)

( * ) Notice: Subject to any disclaimer, the term of this patent is extended or adjusted under 35 U.S.C. 154(b) by 0 days.

(21) Appl. No.: 09/254,157

(22) PCT Filed: Jul. 15, 1997

(86) PCT No.: PCT/EP97/03766

§ 371 Date: Oct. 20, 1999

§ 102(e) Date: Oct. 20, 1999

(87) PCT Pub. No.: WO98/08718

PCT Pub. Date: Mar. 5, 1998

(30) Foreign Application Priority Data

Aug. 27, 1996 (DE) .............................................. 196 34 584

(51) Int. Cl.$^7$ ....................................................... B60T 8/18
(52) U.S. Cl. ......................... 303/22.8; 303/22.1; 188/195
(58) Field of Search ................................. 303/22.1, 22.8; 188/195

(56) References Cited

U.S. PATENT DOCUMENTS

| | | | |
|---|---|---|---|
| 5,215,171 | * | 6/1993 | Longuet et al. ...................... 188/195 |
| 5,407,256 | * | 4/1995 | Saalbach et al. .................... 303/22.8 |
| 5,961,187 | * | 10/1999 | Yamakoshi et al. ................. 303/22.1 |

FOREIGN PATENT DOCUMENTS

| | | |
|---|---|---|
| 35 09 605 | 9/1986 | (DE) . |
| 37 41 718 | 6/1989 | (DE) . |
| 195 34 453 | 3/1997 | (DE) . |
| 0 486 342 | 5/1992 | (EP) . |
| 04 86 342 | 5/1992 | (EP) . |
| 0 759 387 | 2/1997 | (EP) . |

OTHER PUBLICATIONS

Search Report of the German Patent Office for German Appl. 196 34 584.7.

* cited by examiner

Primary Examiner—Christopher P. Schwartz
(74) Attorney, Agent, or Firm—Rader, Fishman & Grauer PLLC

(57) ABSTRACT

The present invention relates to a load-responsive brake force regulator which, for the installation into the vehicle, has a clearance compensation element in the shape of an elastomeric element that automatically moves the actuating lever into the required stop position. After the installation of the brake force regulator into the vehicle, a fixing device is fixed on the pin by means of a screw so that a defined distance is adjusted between the housing of the brake force regulator and the end of a load-responsively acting tension spring. The rubber band is redundant after the fixation. In contrast to the state of the art which proposes the provision of a clearance compensation spring on the lever-side end of the pin and, after fixation, the dissection of the pin at its redundant end by way of a nominal breaking point, the present invention prevents damage to the pin due to transport or improper handling because no nominal breaking point is required.

7 Claims, 4 Drawing Sheets

LOAD-DEPENDENT BRAKE-POWER REGULATOR

TECHNICAL FIELD

The present invention related to vehicle brack systems and more particularly relates to a load-responsive brake force regulator.

BACKGROUND OF THE INVENTION

Load-responsive brake force regulators which are actuated by way of a lever and a spring must be adapted to the special conditions of the vehicle into which they will be installed. One vehicle-related quantity is the distance between the attachment of one spring end on the vehicle and the actuating lever. An adjustment of this type is e.g. effected by a pin which extends between the lever and the other spring end and is attached to the lever, on one side, and to the spring, on the other side. One of the two attachments is axially displaceable on the pin. Thus, a correct pin length can be adjusted in conformity with the vehicle conditions. Care should be taken when adjusting the pin length that the lever is in its stop position on the control valve without clearance. Previously, this action has frequently been carried out manually by maintaining the lever in abutment until the second attachment is fixed. In a case of negligence, however, faults may occur in the correct adjustment of the pin length if the lever has not adopted its due position when the attachment is effected.

EP patent No. 0 486 342 teaches providing the variable attachment on the end of the pin close to the lever. The pin projects through the fixing device and has a compression spring on its other end which acts upon the pin, on the one hand, and on the fixing device, on the other hand. The fixing device, in turn, acts upon the lever. A compression spring of this type automatically ensures that the lever is urged to adopt its preset clearance-free position. The projecting end of the pin must be provided with a nominal breaking point so that, after adjustment of the pin length has been made, the now redundant end piece of the pin along with the spring can be removed. This permits re-use of the clearance compensation spring after the fixation for further brake force regulators.

It may occur, however, that careless manipulation in the assembly or excessive vibrations during transport cause breaking of the pin end already prior to the fixation of the pin length. This necessitates complicated mending operations. At least, replacement of the entire pin is necessary before of the brake force regulator can be installed into a vehicle.

An object of the present invention is to provide a brake force regulator of the type mentioned hereinabove which features inexpensive automatic clearance compensation for the actuating lever and is insensitive to vibrations already prior to the adjustment.

Consequently, the principle of the present invention includes using a simple and inexpensive rubber band as a clearance compensation element. According to the present invention, bands of elastomeric material are referred to as rubber band. A major dispersion of the tensile forces of the rubber bands used can easily be accepted for the mere clearance compensation. When the rubber band is pre-mounted such that it cannot be removed after the adjustment, it may simply be dissected, if its removal is necessary at all. Thus, the pin cannot break, not even if manipulation is incorrect, because there is no nominal breaking point.

For noise-dampening purposes or for centering the control pistons, it is conventional practice to provide further compression springs on a pressure member which act upon the actuating lever so that it is urged away from the housing of the brake force regulator. In order to compensate these spring forces as well, the rubber band is rated so as to be able to overcome springs of this type.

When the rubber band is stretched between a lever-side fixing device on a pin, which is connected rigidly to the lever-side end of an actuating spring configured as a tension spring, and the spring winding which is most remote from the lever, the tensile force of the rubber band may even exceed that of the tension spring because the latter cannot be stretched by the rubber band. Additionally, the rubber band is easily removable without being damaged after mounting into the vehicle.

When the rubber band is stretched between the said fixing device and a shoulder disposed at the pin described hereinabove, the rubber band must be weaker than the tension spring. However, after fixation of the fixing device, the rubber band will not exert any force on the tension spring and may thus remain in the vehicle.

Integral manufacture of the pin and the actuating spring reduces assembly and material costs.

DETAILED DESCRIPTION OF THE PREFERRED EMBODIMENT

Figure 1:
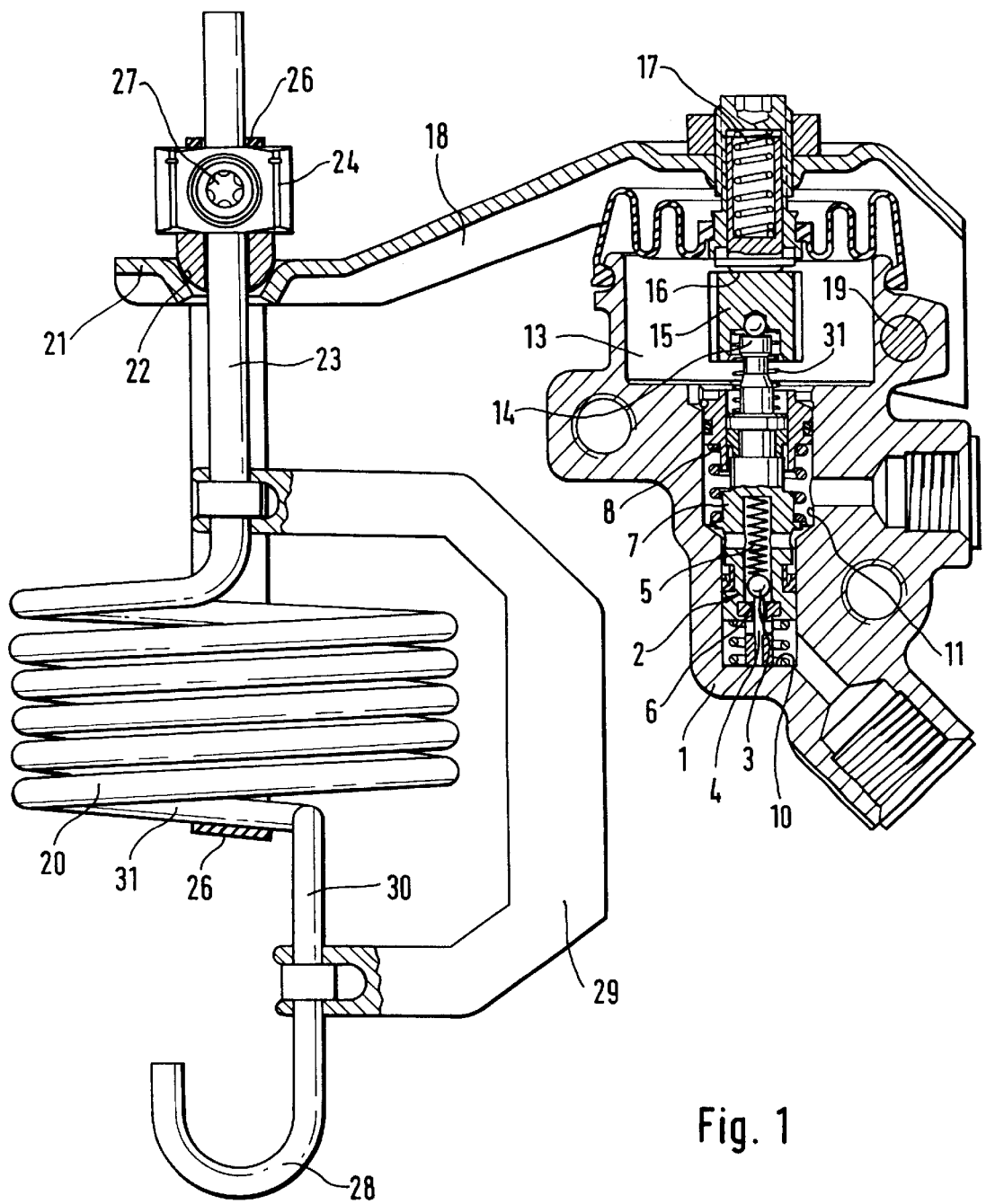
FIG. 1 is a view of a brake force regulator according to the present invention which includes a rubber band as a clearance compensation element.

FIG. 1 shows a brake force regulator according to the present invention which is ready for installation into a vehicle.

The brake force regulator shown is a so-called twin-type brake force regulator. This means that housing 1 accommodates two control valves 2 which are arranged congruently in and behind the plane of projection. The illustrated control valve 2 includes a closure member 3 which is acted upon by a valve spring 5 towards a valve seat 6. The closure member 3 is lifted from the valve seat 6 because it bears with a tappet 4 against a wall 10 which also forms the stop for a stepped piston 7. Stepped piston 7 is acted upon by a control spring 8 in the direction of the wall 10. Wall 10 is the end wall of a stepped bore 11. In its narrower portion, the large step of the stepped piston 7 extends in a sealed fashion from the bore 11 into a control chamber 13 which is devoid of pressure fluid and is subjected to atmospheric pressure. The control valve of the second bore arranged behind bore 11 has an identical design.

Both stepped piston ends 14 which extend from the bores are acted upon in the direction of the wall 10 by a joint pressure member 15 which is similar to a beam of balance. Interposed between each stepped piston 7 and the pressure member 15 is a centering spring, configured as a compression spring, which encompasses the stepped piston end 14. An actuating tappet 16 makes catch at the middle of the pressure member 15 and transmits a load-responsive force evenly onto the two stepped pistons 7. The actuating tappet 16 includes a telescope-type arrangement which is provided with a noise-damping spring 17. The noise-damping spring 17 tends to extend the actuating tappet, i.e., to increase the distance between the pressure member 15 and the lever 18 to which it is attached.

The lever 18 is pivoted on the housing 1 by way of a bearing pin 19. Lever 18 has one arm so that the actuating tappet 16 and the tension spring 20 used for the load-responsive actuation are disposed on the same lever side as viewed from the bearing pin 19. At the lever end 21, lever 18 has a hole 22 through which pin 23 extends. Pin 23 is integrally manufactured with the tension spring 20 in the embodiments shown. This reduces assembly and material costs. At its lever-side end, pin 23 includes a fixing device 24 which is thicker than hole 22. The fixing device 24 includes a setscrew 27 which is configured as a headless screw and permits being screwed to the pin 23 so that said can be fixed axially. When screw 27 is released, pin 23 is permitted to slide freely in the fixing device 24 in an axial direction. A rubber band 26 configured as a rubber ring is stretched around the fixing device 24 and the spring winding 31 which is most remote from it.

With its hook-type deflected end 28 remote from the lever 18, the tension spring, during installation into the vehicle, is suspended in a vehicle part which is load-responsively movable in relation to the vehicle part to which the housing 1 is attached. A defined bias of the tension spring 20 is produced by a setting gauge 29 during this operation. To this end, the setting gauge 29 with one end is attached to the fixing device 24 between the two outside axial areas where the fixing device 24 is narrowed in its diameter. The other end of the setting gauge 29 is fastened to a straight portion 30 of the tension spring 20 close to the end 28.

The assembly of the brake force regulator is effected by mounting the housing 1 in the vehicle and by suspending the end 28 of the tension spring 20. The rubber band exerts such a high amount of tensile force that it can overcome the noise damping spring 18 and the centering spring 31 which is used to center the stepped pistons 7 on the pressure member 15. Lever 18 is thereby set automatically in the position shown. The noise damping spring 17 and the centering spring 31 are compressed so that the actuating tappet 16 is in abutment and the pressure member 15 bears against the stepped piston 7. When all elements have adopted their position so that the lever 18 acts upon the control pistons 7 in a clearance-free fashion, the setscrew 27 on the pin 23 will be fixed. The function of the rubber band 26 is then completed. In a preferred embodiment, rubber band 26, is stronger than the sum of noise damping spring 17 and centering spring 31, that are effective between control valve 2 and lever 18 and that counteract rubber band 26.

In this design, the rubber band 26 has no effect on the tension spring 20 prior to the fixation, hence, it may be stronger than spring 20. However, exactly as the setting gauge 29, the rubber band must be removed after the fixation in order to prevent any effects on the load-responsive actuation when the brake force regulator is employed. Such removal is easily possible without damaging the pin 23 or the rubber band. The arrangement is resistant to fracture even when exposed to major vibrations because there is no need for a nominal breaking point in the pin 23.

Figure 2:
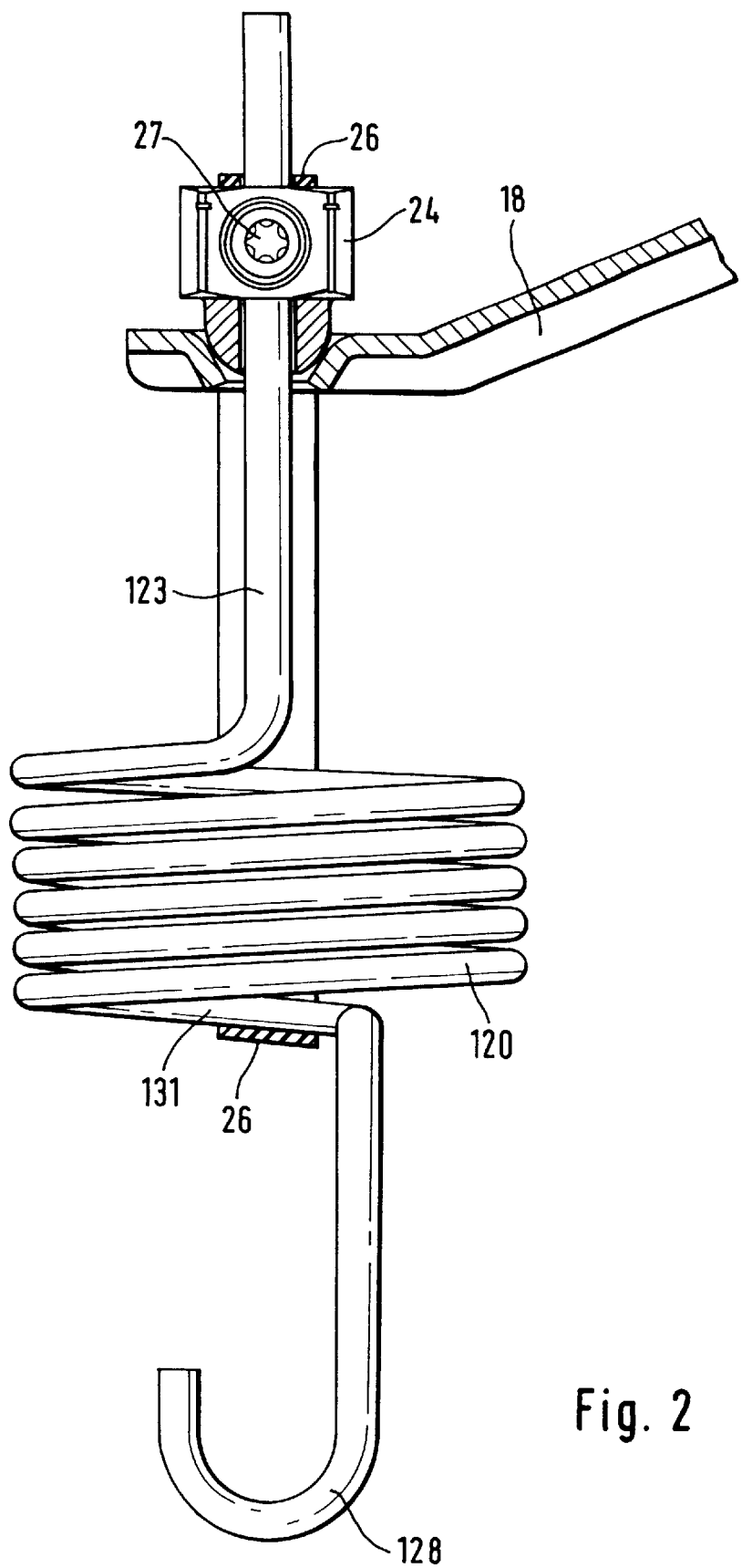
FIG. 2 is a view of an actuating device for a brake force regulator according to the present invention, wherein the actuating spring is modified compared to FIG. 1, and with a rubber band as a clearance compensation element.

FIG. 2 shows an actuating device as a possible substitute for the one of FIG. 1. The rubber band 26 and all other elements which are assigned the same reference numerals as those in FIG. 1 are identical with FIG. 1. Only the tension spring 120 inheres a bias due to a special manufacture which obviates the need for a setting gauge to adjust a bias. Reference is made to the description relating to FIG. 1 as far as the installation into a vehicle is concerned, and it goes without saying that there is no need to remove a setting gauge.

Figure 3:
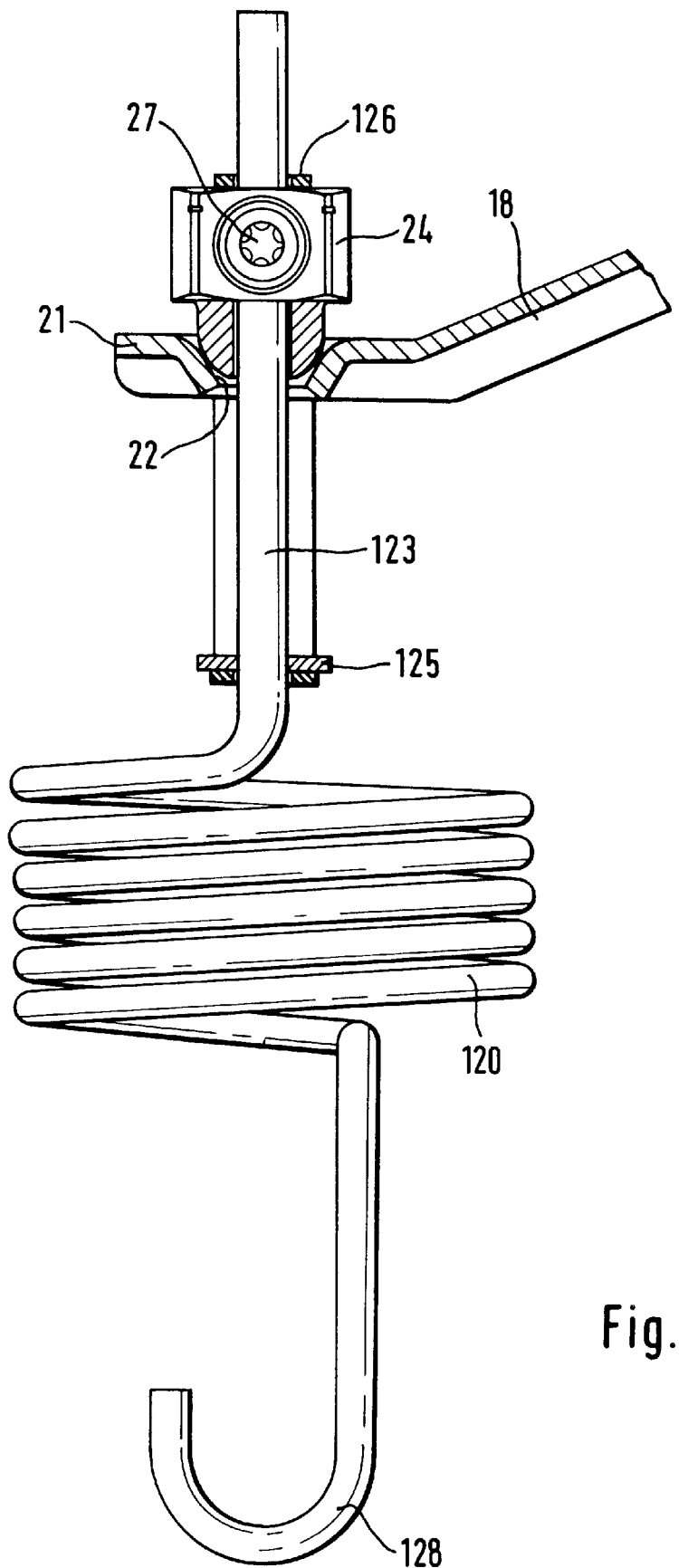
FIG. 3 is an actuating device for a brake force regulator according to the present invention, wherein the actuating spring is modified compared to FIG. 1, and with a differently suspended rubber band as a clearance compensation element.

The tension spring 120 according to FIG. 3 corresponds to that one in FIG. 2, however, the modified attachment of the rubber band 126 on pin 123 may also be carried out on a tension spring according to FIG. 1. Between the lever 18 and the windings of the tension spring 120, a disc 125 is calked with the pin 123 to form a radial shoulder for the rubber band 126. The latter band is stretched between the fixing device 24 and the disc 125. Because the rubber band 126 acts against the tension spring 120 in this embodiment, it is absolutely necessary that it is weaker than the tension spring 120 in order to prevent the tension spring 120 from being drawn apart when the clearance is adjusted. The advantage of this arrangement is that the rubber band is without effect after the fixation of the setscrew 27 and, thus, need not be removed.

Of course, the rubber band may principally be stretched between the fixing device and any one spring winding. However, this will not provide any advantages compared to the above-mentioned embodiments: the rubber band must be weaker than the free spring windings, but it must be removed afterwards in order to release the embraced spring windings.

Figure 4:
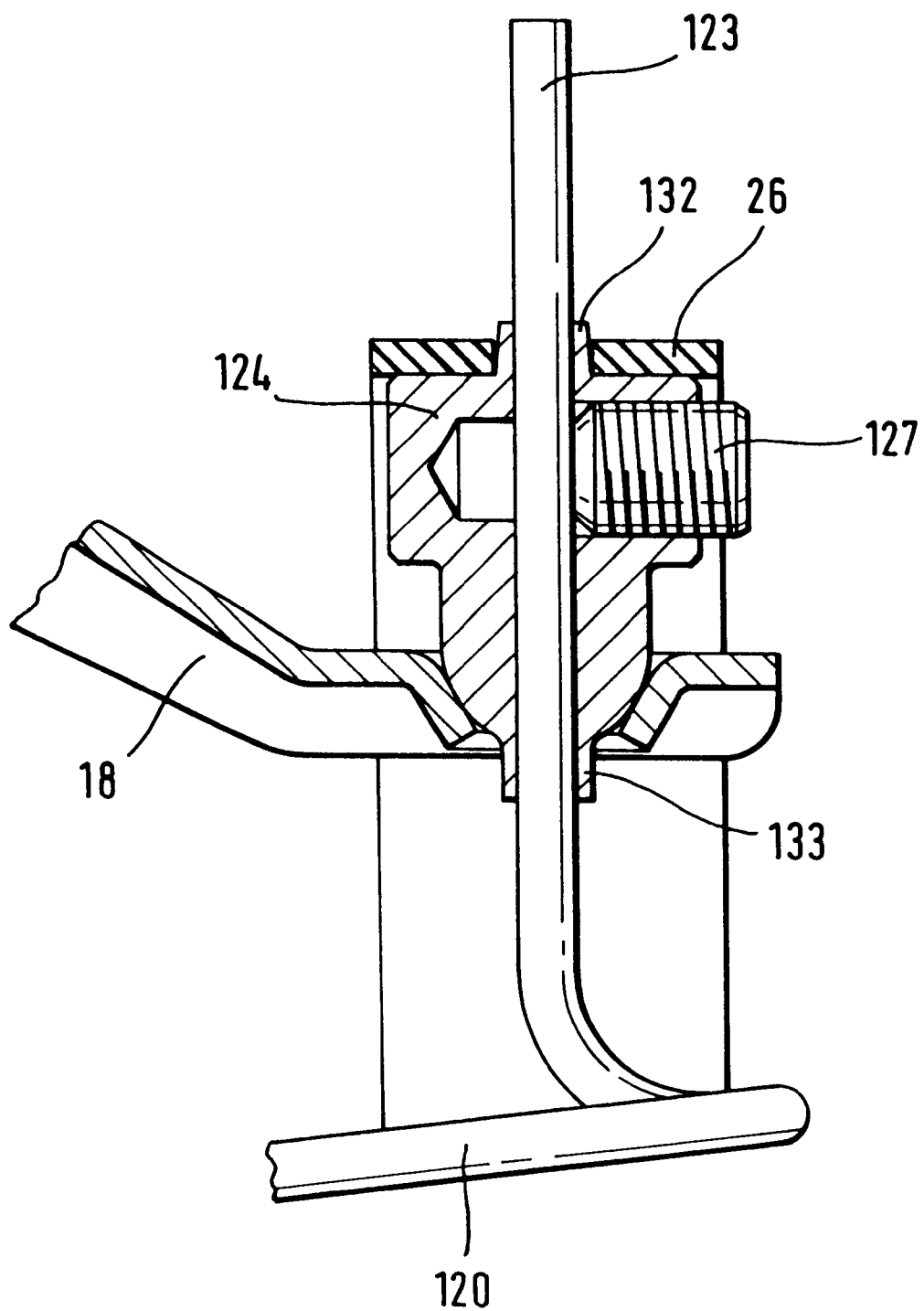
FIG. 4 is a view of an easy-to-mount fixing device with a positioning extension for the rubber band.

FIG. 4 shows an easy-to-mount design of a fixing device 124 with an axial positioning extension 132 for the rubber band 26. The fixing device 124 is mounted on the arrangement shown in the FIG. 2 embodiment, but it is also appropriate for the other designs.

The positioning extension 132 extends through the hole of the rubber band 26 slipped onto the pin 123. Its purpose is to retain the rubber band 26 in its illustrated position even if, during installation of the brake force regulator, the end of the pin 123 which extends through the fixing device 124 temporarily plunges into the fixing device. This will avoid that the rubber band is squeezed between the pin 123 and the fixing device and prevents proper adjustment of the brake force regulator.

A guide extension 133 is used to prevent the pin 123 from sliding out of the fixing device 124 when the spring 120 is mounted into the vehicle, even if the pin 123 has comparatively short dimensions. When the pin 123 is fixed by means of the setscrew 127, the pin 123 is moved by the rubber band 26 to adopt a position in which it can be seized by the setscrew 127.

What is claimed is:
1. Load-responsive brake force regulator for a vehicle, comprising:
   a housing adapted to be fastened to a first vehicle part,
   a lever which acts upon at least one control valve in a load-responsive fashion,
   an actuating spring with two ends having its first end attached to a second vehicle part which is load-responsively moved in relation to the first vehicle part and its second end rigidly coupled to a pin that is mounted at the end of the lever,
   a fixing device for fixing a vehicle-related distance between the first end of the actuating spring and the point of installation at the lever, wherein the pin with its one end projects through the lever and the fixing device, and with a clearance compensation element, wherein the clearance compensation element is an elastomeric element, further including a noise damping spring and a centering spring, wherein said lever is connected to said control valve by way of said noise damping spring and said centering spring, and wherein said elastomeric element is stronger said noise damping spring and said centering spring.

2. Brake force regulator as claimed in claim 1, wherein said elastomeric element is stretched between a lever-side fixing device on a pin which is rigidly coupled to the lever-side end of an actuating spring configured as a tension spring, and the spring winding which is most remote from the lever.

3. Brake force regulator as claimed in claim 1, wherein said elastomeric element is stretched between a lever-side fixing device on a pin which is rigidly coupled to the lever-side end of an actuating spring configured as a tension spring, and a shoulder attached on the pin between the lever and the tension spring.

4. Brake force regulator as claimed in claim 1, wherein the pin is manufactured integrally with the tension spring.

5. Brake force regulator as claimed in claim 1, wherein the fixing device includes a positioning extension for the elastomeric element.

6. Load-responsive brake force regulator for a vehicle, comprising:

a housing adapted to be fastened to a first vehicle part, a lever which acts upon at least one control valve in a load-responsive fashion, an actuating spring with two ends having its first end attached to a second vehicle part which is load-responsively moved in relation to the first vehicle part and its second end rigidly coupled to a pin that is mounted at the end of the lever, a fixing device for fixing a vehicle-related distance between the first end of the actuating spring and the point of installation at the lever, wherein the pin with its one end projects through the lever and the fixing device, and with a clearance compensation element, wherein the clearance compensation element is an elastomeric element, wherein said elastomeric element is stretched between a lever-side fixing device on a pin which is rigidly coupled to the lever-side end of an actuating spring configured as a tension spring, and the spring winding which is most remote from the lever.

7. Load-responsive brake force regulator for a vehicle, comprising:

a housing adapted to be fastened to a first vehicle part, a lever which acts upon at least one control valve in a load-responsive fashion, an actuating spring with two ends having its first end attached to a second vehicle part which is load-responsively moved in relation to the first vehicle part and its second end rigidly coupled to a pin that is mounted at the end of the lever, a fixing device for fixing a vehicle-related distance between the first end of the actuating spring and the point of installation at the lever, wherein the pin with its one end projects through the lever and the fixing device, and with a clearance compensation element, wherein the clearance compensation element is an elastomeric element, wherein said elastomeric element is stretched between a lever-side fixing device on a pin which is rigidly coupled to the lever-side end of an actuating spring configured as a tension spring, and a shoulder attached on the pin between the lever and the tension spring.

* * * * *